(12) United States Patent
Kopra et al.

(10) Patent No.: US 9,496,589 B2
(45) Date of Patent: Nov. 15, 2016

(54) SYSTEM FOR PACKAGING AND THERMAL MANAGEMENT OF BATTERY CELLS

(71) Applicant: Valmet Automotive Oy, Uusikaupunki (FI)

(72) Inventors: Lasse Kopra, Vinkkilae (FI); Jusso Kelkka, Laitila (FI)

(73) Assignee: VALMET AUTOMOTIVE OY, Uusikapunki (FI)

( * ) Notice: Subject to any disclaimer, the term of this patent is extended or adjusted under 35 U.S.C. 154(b) by 0 days.

(21) Appl. No.: 14/888,026

(22) PCT Filed: May 15, 2013

(86) PCT No.: PCT/FI2013/050531
§ 371 (c)(1),
(2) Date: Oct. 29, 2015

(87) PCT Pub. No.: WO2014/184419
PCT Pub. Date: Nov. 20, 2014

(65) Prior Publication Data
US 2016/0111761 A1    Apr. 21, 2016

(51) Int. Cl.
*H01M 10/6556* (2014.01)
*H01M 10/6551* (2014.01)
(Continued)

(52) U.S. Cl.
CPC ....... *H01M 10/6556* (2015.04); *H01M 2/1077* (2013.01); *H01M 10/613* (2015.04); *H01M 10/617* (2015.04); *H01M 10/625* (2015.04); *H01M 10/647* (2015.04); *H01M 10/6551* (2015.04); *H01M 10/6555* (2015.04); *H01M 2220/20* (2013.01)

(58) Field of Classification Search
CPC ......... H01M 10/6556; H01M 10/617; H01M 10/6551; H01M 10/6555; H01M 10/613; H01M 10/625; H01M 2/1077; H01M 10/647; H01M 2220/20
See application file for complete search history.

(56) References Cited

U.S. PATENT DOCUMENTS 5,756,227 A    5/1998   Suzuki et al.
2004/0201366 A1   10/2004   Kimoto et al.
(Continued)

FOREIGN PATENT DOCUMENTS

DE    102008059953 A1 *   6/2010   ............. H01M 2/10
WO    WO 2012/052131 A2   4/2012

OTHER PUBLICATIONS

Machine English Translation of 102008059953.*
(Continued)

*Primary Examiner* — Milton I Cano
*Assistant Examiner* — Michael Dignan
(74) *Attorney, Agent, or Firm* — Alston & Bird LLP

(57) ABSTRACT

A system for packaging and thermal management of battery cells in a battery module is provided. The battery module comprises at last one extruded aluminum or aluminum alloy profile (40) provided with a plurality of thermal transfer fins (42) arranged at a space from each other. A plurality of battery cells (1) is mounted in the at least one profile (40) in thermal contact with the thermal transfer fins (42). Thermal transfer medium is arranged in thermal contact with the at least one profile (40) so that thermal energy is conducted through the aluminum or aluminum alloy profile (40) so that thermal energy is conducted through the aluminum or aluminum alloy profile (40) from/to the battery cells (1) to/from the thermal transfer medium.

3 Claims, 2 Drawing Sheets

(51) Int. Cl.
*H01M 10/6555* (2014.01)
*H01M 10/617* (2014.01)
*H01M 2/10* (2006.01)
*H01M 10/625* (2014.01)
*H01M 10/647* (2014.01)
*H01M 10/613* (2014.01)

(56) References Cited

U.S. PATENT DOCUMENTS

| | | | |
|---|---|---|---|
| 2005/0026014 A1* | 2/2005 | Fogaing | H01M 2/00 429/437 |
| 2009/0180251 A1 | 7/2009 | Biagini et al. | |
| 2010/0151308 A1* | 6/2010 | Hermann | H01M 2/1077 429/120 |
| 2010/0216004 A1 | 8/2010 | Yoon | |
| 2011/0305935 A1* | 12/2011 | Yoon | B60L 11/1879 429/120 |
| 2012/0045681 A1 | 2/2012 | Klaus et al. | |
| 2012/0094165 A1* | 4/2012 | Valencia, Jr. | H01M 10/0525 429/120 |
| 2012/0107662 A1* | 5/2012 | Rommler | C04B 35/536 429/120 |
| 2012/0148881 A1 | 6/2012 | Quisenberry | |
| 2012/0171543 A1* | 7/2012 | Hirsch | B60K 1/04 429/120 |
| 2012/0171545 A1* | 7/2012 | Hohenthanner | H01M 2/1061 429/120 |
| 2013/0344362 A1* | 12/2013 | Raisch | F28D 1/00 429/93 |

OTHER PUBLICATIONS

International Searching Authority, International Search Report for International Application No. PCT/FI2013/050531, Mar. 6, 2014, 5 pages, National Board of Patents and Registration of Finland, Finland.

International Preliminary Examining Authority (IPEA), International Preliminary Report on Patentability for International Application No. PCT/FI2013/050531, including Applicant's Jul. 24, 2015 Response to the Second Written Opinion of the IPEA, Aug. 13, 2015, 14 pages, National Board of Patents and Registration of Finland, Finland.

* cited by examiner

SYSTEM FOR PACKAGING AND THERMAL MANAGEMENT OF BATTERY CELLS

TECHNICAL FIELD

The present invention relates to a system for packaging and thermal management of battery cells.

BACKGROUND

The operation life of rechargeable battery cells is significantly depending on the temperature of the battery cells during their operation life. In order to obtain a longest possible operation life for battery cells their operating temperature should be maintained on a certain level or within a certain temperature range during operation. Recharging or discharging battery cells creates thermal energy which has to be conducted from the cells as effectively as possible. Further, in some situations it must be possible to warm up the battery cells in order to get them to a desired operating temperature. Also, during charging or discharging of a battery, internal resistances of the battery terminals form waste energy which transforms to heat. This heat should also be conducted away. So, the most effective way of cooling would be cooling directly from the battery terminals. However, a great short-circuit risk causes a big challenge for this type of cooling.

The battery cells should also be protected against damages and deformation. When being damaged the battery cells may form short-circuit which could lead to an uncontrolled electric discharge in a form of a fire or an explosion. If possible, the deformation of battery cells should be prevented by a safe structure which takes various accident situations into account.

One example of prior art systems is disclosed in publication US 2012/0148881 A1. This publication discloses a battery-cooling system including a battery array and a plurality of heat pipes. The heat pipes each include a low-profile extrusion having a plurality of hollow tubes formed therein. Each heat pipe includes an evaporator portion and a condenser portion. A heat-transfer fluid is disposed within the plurality of hollow tubes. The evaporator portion is disposed between successive batteries within the battery array. The condenser portion is disposed outside of the battery array and exposed to as heat sink. The structure shown in this publication does not form any support structure, housing or supporting frame for the battery cells and battery modules comprising a plurality of battery cells.

A further prior art system is disclosed in publication US 2009/0180251 A1. This publication discloses a housing made of aluminum alloy extruded section member for manufacturing waterproof power electronic devices. The extruded section forms a tunnel that is substantially rectangular and is provided with fins on at least one side of the rectangle. The fins allow air to flow outside the housing by natural convection in the extrusion directions. A side without fins serves as a base for fastening the housing and as a support for power electronic components of the power electronic device. The fins are machined transversely to the extrusion direction to form notches in the fins. The notches are aligned in succession to allow air to flow outside the housing by natural convection in the optimum direction. This publication is silent about any battery cells, but if the housing disclosed in this publication were used to locate battery cells inside it, said battery cells could not be positioned so that good thermal conductivity could be achieved.

SUMMARY

The object of the present invention is to provide an improved system for packaging and thermal management of battery cells, by which the problems relating to prior art technique are at least mainly avoided. The object of the invention is achieved by the system in which the battery module comprises at least one extruded aluminum or aluminum alloy profile provided with a plurality of thermal transfer fins arranged at a space from each other and a plurality of battery cells mounted in said at least one profile in thermal contact with the thermal transfer fins, whereby thermal transfer medium is arranged in thermal contact with said at least one profile so that thermal energy is conducted through said aluminum or aluminum alloy profile from/to the battery cells to/from said thermal transfer fluid.

The extruded profile/profiles form a protective housing and a supporting structure for the battery module containing the battery cells.

At least one channel for thermal transfer medium to flow therein is integrated in the extruded aluminum or aluminum alloy profile in the extrusion process of the profile.

The profiles are formed so that direct contact between the battery terminals and the profiles is prevented. This is attained so that the profiles are provided with a shoulder structure so that a space and an adequate creepage distance for electric insulation is formed between the battery terminals and the profile.

An electrically insulating thermal compound can be applied in the space between the battery terminals and the profile to provide thermal contact between said profile and the battery terminals.

The aluminum or aluminum alloy profiles are cut to different and desired lengths in order to obtain a protective housing and supporting structure for a desired amount of battery cells.

Several advantages over prior art are attainable by the present invention. In the invention the housings and the supporting structures for the battery cells are made of extruded profiles of aluminium alloy. Extruded profiles make it possible to manufacture structures that are easily scalable and by which battery modules of different sizes can be made. Channels for thermal transfer medium can be seamlessly integrated in the supporting structure of the battery module, i.e. in the profile, whereby the efficiency of heat transfer is increased and the amount of components in the module is small. Heat transfer medium is made to circulate in the channels and with the aid of said heat transfer medium thermal energy is either conducted from the profile to cool the battery cells or brought into the profile to bring the battery cells in a desired temperature. The inventive structure makes it possible that thermal energy can be conducted directly from the battery terminals to the profile by providing paste or a gap pad between the battery terminals and the profile, which paste or gap pad is an electric insulator having at the same time good heat conduction properties. Extruded profiles form simultaneously a protective housing and a supporting structure for the battery cells. Internal couplings between fluid channels are minimized by the structure improving the reliability. Due to the protective housing the module can be assembled in any position.

Further advantages, characteristic features and embodiments of the invention will come out in more detail in the following description, in which the invention is described with reference to the figures in the accompanying drawings.

However, it is to be emphasized that the purpose of the drawings is to illustrate the embodiments of the invention by simplified examples only.

DETAILED DESCRIPTION OF THE EMBODIMENTS

Figure 1:
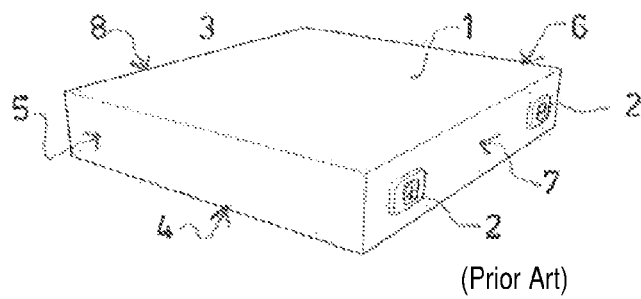
FIG. 1 is a perspective view of a typical prismatic battery cell.
Figure 2:
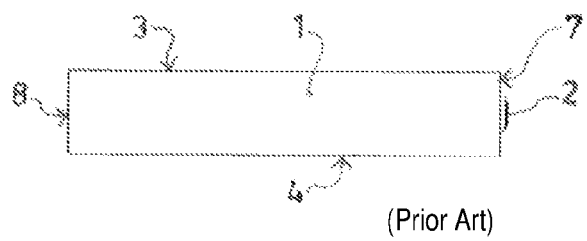
FIG. 2 is a side view of the battery cell of FIG. 1.

In FIGS. 1 and 2 the battery cell is denoted with reference numeral 1. The battery cell 1 of FIGS. 1 and 2 is a typical prismatic battery cell comprising four side surfaces 3, 4, 5 and 6 and two end surfaces 7 and 8. The battery cell 1 is designed so that two of the side surfaces 3, 4 have a large surface area while the remaining two side surfaces 5, 6 are considerable smaller. Battery terminals 2 are situated on the first end surface 7.

Figure 3:
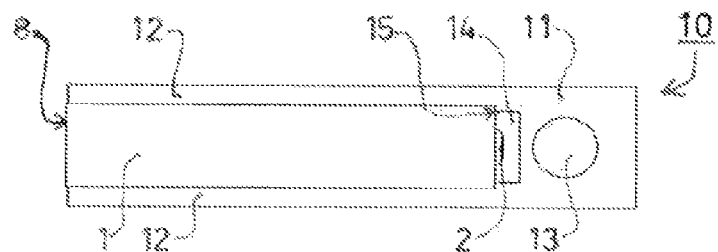
FIG. 3 shows an embodiment of the invention in which a profile of aluminum or aluminum alloy is used as a heat conductor between the battery cell and the cooling channel.

FIG. 3 shows an embodiment of the invention comprising an extruded profile 10 made of aluminum or aluminum alloy. In this embodiment the profile 10 comprises a body 11 with two parallel thermal transfer fins 12 arranged at a space from each other. In this embodiment a channel 13 for thermal transfer fluid is formed in the body 11 of the profile. The fins 12 together with the body 11 of the profile 10 form a groove in which battery cells 1 are positioned, so that the larger side surfaces 3, 4 of the battery cells 1 come to contact with the thermal transfer fins 12, whereby heat produced by the battery cells 1 is conducted directly to the profile 10 and further to thermal transfer fluid circulating in the channel 13.

As FIG. 3 shows the battery terminals 2 are not in contact with the profile 10. A shoulder structure 15 is formed in the profile 10 to prevent direct contact between the battery terminals 2 and the profile 10, so that there is a space 14 between the first end surface of the battery cells 1 and the profile 10. The shoulder structure 15 is arranged so that an adequate creepage distance for electrical insulation is achieved between the battery terminals 2 and the profile 10. In order to increase the efficiency of heat transfer from the battery cells 1 to the profile 10 thermal energy can be conducted directly from the battery terminals 2 to the profile 10 by providing an electrically insulating thermal compound, e.g. paste or a gap pad in the space 14 between the battery terminals 2 and the profile 10. Naturally, this kind of paste or gap pad must be a good electric insulator to avoid any short-circuits and in order to transfer heat from the battery terminals 2 to the profile 10 it must at the same time have good heat conduction properties. Even though the profile 10 is open at one end so that the end surface 8 of the battery cell 1 is exposed the extruded profile forms a protective housing and a supporting structure for the battery cells 1 located in the profile 10. In the final product however, the ends of the profile can be closed and are meant to be closed e.g. by a closing cover.

Figure 4:
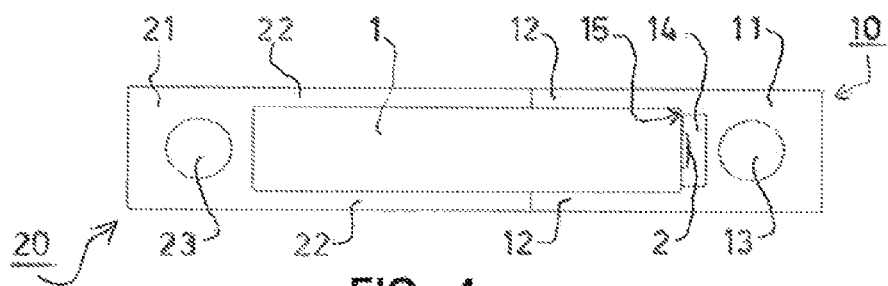
FIG. 4 shows an embodiment in which two profiles are used to cool the same battery cell.

FIG. 4 shows an embodiment in which the protective housing and supporting structure for the battery cells 1 is formed of two profiles 10 and 20. So, in this embodiment the battery cells 1 are enclosed by two profiles 10, 20, the first one 10 of which is situated on the battery terminal 2 side of the battery cells 1 and the second one 20 of which being on the opposite side of the battery cells 1. The design of both profiles 10, 20 is essentially similar, so that each profile comprises a body 11, 21 with two parallel thermal transfer fins 12, 22 arranged at a space from each other. A channel 13, 23 for thermal transfer fluid is formed in the body 11, 21 of the profile. The fins 12, 22 together with the body 11, 21 of the profile 10, 20 form a groove in which battery cells 1 are positioned, so that the larger side surfaces 3, 4 of the battery cells 1 come to contact with the thermal transfer fins 12, 22. Consequently, heat produced by the battery cells 1 is conducted directly to the profile 10, 20 and further to thermal transfer fluid circulating in the channel 13, 23. The profiles 10, 20 are mounted opposite each other so that the free ends of the thermal transfer fins 12, 22 are abutting one another. Also in this embodiment there is a space 14 between the first end surface 7 of the battery cells 1 and the first profile 10 so that the battery terminals 2 are not in contact with the profile 10. This is achieved by the shoulder structure 15 as explained earlier. As already explained in connection with FIG. 3 a similar paste or gap pad can be mounted in said space 14.

Figure 5:
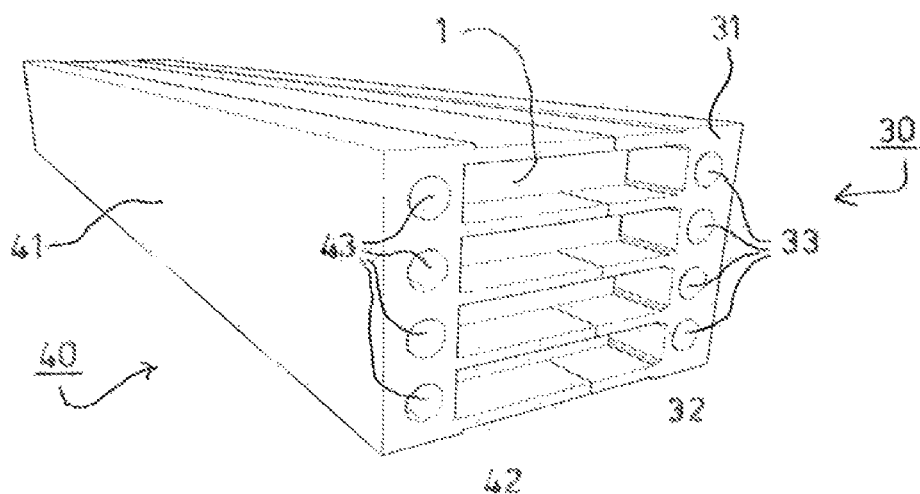
FIG. 5 shows an embodiment in which a plurality of battery cells are mounted in the profiles provided with cooling channels to form a battery module.
Figure 6:
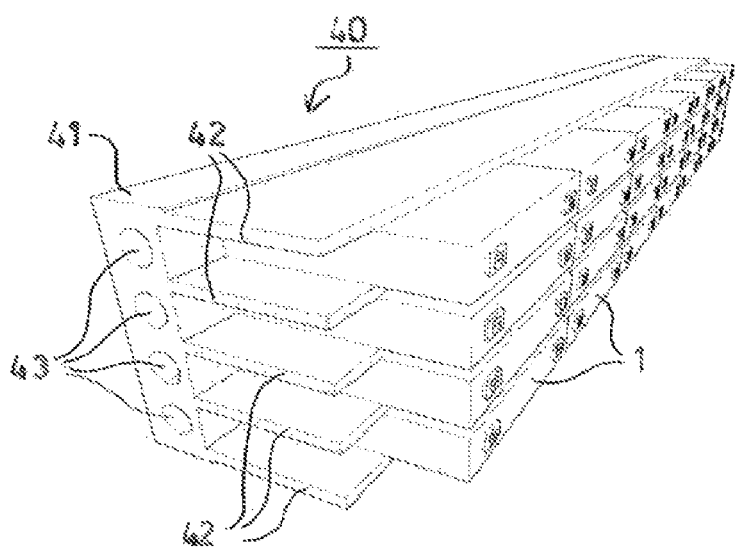
FIG. 6 shows the battery module of FIG. 5, the profile on the terminal side of the battery cells taken away.

Finally, FIGS. 5 and 6 show an embodiment in which a plurality of battery cells 1 are mounted in the profiles 30, 40 provided with cooling channels 33, 43 to form a battery module. The embodiment shown in FIGS. 5 and 6 differ from the previously explained embodiments in that the battery module of FIGS. 5 and 6 is a bigger aggregate comprising a plurality of battery cells arranged one upon another, so that the thermal transfer fins 32, 42 remain between the battery cells 1. A plurality of channels 33, 43 for thermal transfer fluid are also made in the profile bodies 31, 41.

Common features for all embodiments are that the profiles are manufactured of aluminum or aluminum alloy by extrusion and that the channels and fins are made in the profile during the extrusion phase. Further, in all embodiments the extruded profiles form simultaneously a protective housing and a supporting structure for the battery cells. The profiles can be cut to different and desired lengths in order to obtain a protective housing and supporting structure for a desired amount of battery cells. The inventive system is applicable for various purposes and it is especially suitable in automotive industry and for electric vehicles.

Above, the invention has been described by way of examples with reference to the exemplifying embodiments illustrated in the accompanying drawings. The invention is, however, not confined to the exemplifying embodiments shown in the drawings alone, but the invention may vary within the scope of the inventive idea defined in the accompanying claims.

The invention claimed is:

1. A system for packaging and thermal management of one or more battery cells in a battery module, the system comprising:
one or more battery cells, each of said battery cells being a prismatic battery cell comprising two end surfaces, a first end surface on which battery terminals are situated, and a second end surface, four side surfaces, a first side surface and a second side surface having a larger surface area than a third side surface and a fourth side surface; the battery module comprising:

at least one extruded aluminum or aluminum alloy profile provided with a plurality of thermal transfer fins arranged at a space from each other; and a plurality of battery cells mounted in said at least one profile in thermal contact with the thermal transfer fins, whereby thermal transfer medium is arranged in thermal contact with said at least one profile so that thermal energy is conducted through said aluminum or aluminum alloy profile from/to the battery cells to/from said thermal transfer fluid, each profile comprising a body with a channel for thermal transfer fluid and parallel thermal transfer fins arranged at a space from each other, said fins having free ends, the fins together with the body forming a groove in which battery cells are positioned so that the first and second side surfaces of the battery cells are in contact with the thermal transfer fins and that the aluminum or aluminum alloy profiles are cut to different and desired lengths in order to obtain a protective housing and supporting structure for a desired amount of battery the profiles are formed so that direct contact between the battery terminals and the profiles is prevented, the profiles comprising a shoulder structure arranged so that a space configured for electric insulation is formed between the battery terminals and the prefile and that an electrically insulating but thermally conductive compound is applied in the space between the battery terminals and the profile to provide thermal contact between said profile and the battery terminals.

2. The system of claim 1, wherein the at least one extruded profile forms a protective housing and a supporting structure for the battery module containing the battery cells.

3. The system of claim 1, at least one channel for thermal transfer medium to flow therein is integrated in the extruded aluminum or aluminum alloy profile in the extrusion process of the profile.

* * * * *

UNITED STATES PATENT AND TRADEMARK OFFICE
CERTIFICATE OF CORRECTION

PATENT NO. : 9,496,589 B2
APPLICATION NO. : 14/888026
DATED : November 15, 2016
INVENTOR(S) : Kopra et al.

It is certified that error appears in the above-identified patent and that said Letters Patent is hereby corrected as shown below:

In the Specification

Column 6
Line 2, "supporting structure for a desired amount of battery the" should read --supporting structure for a desired amount of battery cells, the--
Line 7, "prefile" should read --profile--

Signed and Sealed this
Ninth Day of May, 2017

Michelle K. Lee
*Director of the United States Patent and Trademark Office*